United States Patent Office
3,830,933
Patented Aug. 20, 1974

3,830,933
1-SUBSTITUTED BIGUANIDES AS ANTI-HYPERTENSIVE AGENTS
Julius Diamond, Lafayette Hill, George H. Douglas, Paoli, and Bernard J. Burns, Philadelphia, Pa., assignors to William H. Rorer, Inc., Fort Washington, Pa.
No Drawing. Original application Nov. 12, 1970, Ser. No. 89,005, now abandoned. Divided and this application May 12, 1971, Ser. No. 142,797
Int. Cl. A61k 7/00
U.S. Cl. 424—326
9 Claims

ABSTRACT OF THE DISCLOSURE

1 - aryl and aralkyl biguanide compounds possess useful gastric anti-secretory and spasmolytic properties. Compounds of this type which also display anti-hypertensive and CNS depressant properties are also disclosed.

CROSS REFERENCE TO RELATED APPLICATIONS

This is a division of copending application Ser. No. 89,005, filed Nov. 12, 1970 now abandoned.

SUMMARY OF THE INVENTION

This invention describes new 1-substituted biguanide compounds and processes for their preparation. This invention further provides valuable pharmaceutical preparations which contain 1-substituted biguanide compounds as active gastric antisecretory and spasmolytic agents. A method for the treatment of gastrointestinal disorders and diseases is also described. The compounds of this invention also possess an effective degree of antihypertensive and CNS depressant.

BACKGROUND OF THE INVENTION

The pharmaceutical compositions which have been used as gastric antisecretory and spasmolytic agents have been such as atropine, homatropine, propantheline bromide, dicyclomine hydrochloride and other compounds which are structurally dissimilar to the biguanides of this invention. Due to the anticholinergic properties of these compounds they are known to produce undesirable side effects such as mydriasis, xerostomia, cyclopegia and other unwanted effects.

There have been a number of 1-aryl and aralkylbiguanides described in the literature. They have been proposed for use as antidiabetics, anorexigenic or antimalarial agents. J. H. Burn and J. R. Vane, however, in The Brit. J. Pharmacol. (1948), 3:346–9 tested 1-(p-chlorophenyl) biguanide and 1-(p-methoxyphenyl)biguanide for their ability to reduce gastric secretion. Their findings determined that little or no reduction of gastric secretion was associated with these compounds. Contrary to this belief:

We have unexpectedly found that the 1-substituted biguanides of this invention are valuable pharmacologic agents which possess useful gastric antisecretory and spasmolytic properties.

We have also found that the compounds of this invention are substantially free of the anticholinergic side-effects which accompany gastric antisecretory and spasmolytic agents.

We have further found that the compounds of this invention have a low order of toxicity.

We have still further found a simple and effective method for treating gastrointestinal disorders and diseases, such as duodenal and peptic ulcers.

We have found that the 1-substituted biguanides of this invention also have an effective degree of antihypertensive and CNS depressant.

DESCRIPTION AND PREFERRED EMBODIMENT

This invention describes a class of novel chemical compounds which contain a phenyl, substituted phenyl, aralkyl or substituted aralkyl radical attached to a biguanide chain. This invention further describes its non-toxic pharmaceutically acceptable salts and the method of preparing the instant compounds.

This invention also describes a new method of treating gastrointestinal disorders and diseases and of gastrointestinal therapeutic compositions, which comprises the administration of a 1-substituted biguanide compound having the structural formula as shown in Figure I.

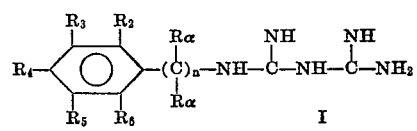

where:

$n$ is 0–1;
$R_a$ is hydrogen, or loweralkyl;
$R_2$, $R_3$, $R_4$, $R_5$ and $R_6$ may be the same or different and are hydrogen, loweralkyl, nitro, amino, haloloweralkoxy, haloloweralkyl, hydroxy, cyano, thiocyanato, carboxy, carbalkoxy, diloweralkylsulfonamido, phenoxy, acyloxy, halophenoxy, phenyl or halophenyl;
$R_2$, $R_3$, $R_5$ and $R_6$ may also be halo and loweralkoxy;
$R_4$ may also be halo and lower alkoxy provided $R_2$, $R_3$, $R_6$ and $R_5$ are not all hydrogen at the same time;

and their non-toxic acid addition salts.

The more preferred compounds for a method of treating gastrointestinal disorders and diseases and for use in gastrointestinal therapeutic compositions embrace those compounds of structural formula II,

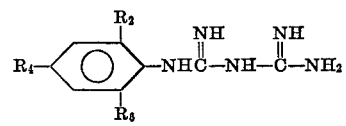

where:

$R_2$ and $R_6$ are hydrogen, halo, haloloweralkyl or alkoxy;
$R_4$ is hydrogen, haloloweralkyl, hydroxy, nitro, or halo provided both $R_2$ and $R_6$ are not both hydrogen at the same time.

The most preferred compounds for a method of treating gastrointestinal disorders and diseases and for the gastrointestinal compositions embrace those compounds of structural formula II, where:

$R_2$, $R_4$ and $R_6$ are hydrogen, chloro, bromo, fluoro or trifluoromethyl, provided $R_4$ is not chloro when both $R_2$ and $R_6$ are hydrogen.

In the descriptive portions of this invention, the following definitions apply:

The term "lower alkyl" refers to an alkyl hydrocarbon group containing from 1 to about 8 carbon atoms which may be straight chained or branched.

The "acyl" radical may be any organic radical derived from an organic acid by its removal of the hydroxyl group such as acetyl, propionyl, benzoyl, etc.

The "lower alkoxy" radical signifies an alkoxy group containing from 1 to about 8 carbon atoms which can be straight chained or branched.

The compounds of structural formula I are also useful in the treatment of hypertensive and CNS depressant disorders. The more preferred compounds used in a method of treating hypertensive disorders are those described by figure II where $R_4$ is hydrogen. The most preferred compounds are those described by figure II where $R_2$ and $R_6$ are fluoro, chloro, bromo or trifluoromethyl.

This invention further describes new chemical compounds which are generically described by the structural formula as shown in FIG. I.

where:

$n$ is 0–1;
$R_a$ is hydrogen or lower alkyl;
$R_2$, $R_3$, $R_4$, $R_5$ & $R_6$ may be the same or different and are: haloloweralkyl, hydroxy, cyanato, carboxy, carbalkoxy, diloweralkylsulfonamido, phenoxy, halophenoxy, acyloxy, haloloweralkoxy or phenyl, halophenyl;
$R_2$, $R_3$, $R_5$ & $R_6$ may also be fluoro, bromo, chloro, nitro, amino, dialkylamino or cyano;
when $R_2$ & $R_6$ are substitiuted then $R_4$ may also be hydrogen, fluoro, bromo, chloro, iodo, nitro or cyano;
$R_3$ and $R_5$ may be hydrogen; and
$R_2$ and $R_6$ may be hydrogen, when $n$ is 1 provided there are fewer than 4 hydrogens present.

The more preferred compounds of this invention embrace those compounds of structural formula I where: $n$ is 0.

The most preferred compounds of this invention embrace those compounds of structural formula II where $n$ is 0 and $R_2$ and $R_6$ are iodo, chloro, bromo, fluoro or nitro; and $R_4$ is hydrogen, halo, nitro, or trifluoromethyl.

It is well known in the pharmacological arts that non-toxic acid addition salts of pharmacologically active amine compounds do not differ in activities from their free base. The salts merely provide a convenient solubility factor.

The amines of this invention may be readily converted to their non-toxic acid addition salts by customary methods in the art. The non-toxic salts of this invention are those salts the acid component of which is pharmacologically acceptable in the intended dosages; such salts would include those prepared from inorganic acids, organic acids, higher fatty acids, high molecular weight acids, etc. and include such as:

| | |
|---|---|
| hydrochloric acid, | succinic acid, |
| hydrobromic acid | glycolic acid, |
| sulfuric acid, | lactic acid, |
| nitric acid, | salicylic acid, |
| phosphoric acid, | benzoic acid, |
| methane sulfonic acid, | nicotinic acid, |
| benzene sulfonic acid, | phthalic acid, |
| acetic acid, | stearic acid, |
| propionic acid | oleic acid, |
| malic acid | abietic acid, etc. |

It will further be appreciated by one skilled in the art that the following radicals may be employed in the practice of this invention:

where:

$n$ is also 2;
$R_a$ is loweralkenyl, cycloloweralkyl, haloloweralkyl, arloweralkyl, or aryl;
$R_2$, $R_3$, $R_4$, $R_5$ & $R_6$ is lower alkyenyl, aminoloweralkyl, alkylaminoloweralkyl, hydroxyloweralkyl, mercapto, loweralkylthio, loweralkylsulfinyl, loweralkylsulfonyl, sulfonamido, loweralkoxyloweralkyl, mercaptoloweralkyl, loweralkylmercaptoloweralkyl, arloweralkylmercaptoloweralkyl, arloweralkyl, arloweralkenyl, halobenzyl, anilino, loweralkoxyphenyl, biphenylyl, phenoxy, benzyloxy,
a polyfluoro group such as trifluoromethylsulfonyl, trifluoroacetyl, trifluoroacetoxy, trifluorocarbomethoxy, di-(trifluoromethylamino)sulfonyl, di-(trifluoromethylamino)carbonyl, or $\beta,\beta$-difluorovinyl.

The products of this invention can contain an asymmetric carbon atom when $n=1$. For this reason they may be obtained as racemic mixtures or as dextro (+) and levorotatory (—) isomers. These may be separated by any of the various methods of resolution. A method that may be employed is combining the racemic compound with an optically active compound, for example, by salt formation. Two products are then obtained. If the instant biguanides are added to an optically active acid, such as (+) or (—)-tartaric acid, then the salts produced possess different properties and different solubilities and can be separated by fractional crystallization. When the salts have been separated by repeated crystallization, the acid is split off and the pure $d$- or $l$-biguanide compound is obtained. It is to be understood that these optical isomers are embraced within the extent of this invention.

Representative compounds of this invention which are particularly useful are as follows:

1-(p-trifluoromethylphenyl)biguanide
1-(p-trifluoromethoxyphenyl)biguanide
1-(p-dimethylsulfamylphenyl)biguanide
1-(p-trifluoromethylbenzyl)biguanide
1-(2,6-dichlorophenyl)biguanide
1-(2,6-dibromophenyl)biguanide
1-(2,4,6-trichlorophenyl)biguanide
1-(2,6-dichlorobenzyl)biguanide
1-(2,4,6-trichlorobenzyl)biguanide
1-(2,6-dichloro-4-hydroxyphenyl)biguanide
1-(2,6-dichloro-$\alpha$-methylbenzyl)biguanide
1-(3,5-ditrifluoromethylphenyl)biguanide
1-(3,4,5-trimethoxyphenyl)biguanide
1-(2,4,6-trimethoxyphenyl)biguanide
1-(3,5-dichloro-4-methoxyphenyl)biguanide
1-(2,3,4,6-tetrafluorophenyl)biguanide
1-(2,3,4,5-tetrafluorophenyl)biguanide
1-(2,6-dibromo-4-trifluoromethylphenyl)biguanide
1-(2,4,6-tribromophenyl)biguanide
1-(2,6-dibromo-4-chlorophenyl)biguanide
1-(2,6-dichloro-4-bromophenyl)biguanide
1-(2,6-dichloro-4-trifluoromethylphenyl)biguanide
1-(2,4-dichloro-6-thiocyanatophenyl)biguanide
1-(2,6-dibromo-4-fluorophenyl)biguanide
1-(2,6-dichloro-4-thiocyanatophenyl)biguanide
1-(2,6-dichloro-4-fluorophenyl)biguanide
1-(2,6-dibromo-4-iodophenyl)biguanide
1-(2,6-dichloro-4-nitrophenyl)biguanide
1-(2,4-dichloro-6-nitrophenyl)biguanide
1-(2,6-dinitro-4-chlorophenyl)biguanide
1-(2,6-dibromo-4-nitrophenyl)biguanide
1-(2,6,4'-trichloro-4-biphenyl)biguanide
1-(2,6-dichloro-4-phenoxyphenyl)biguanide
1-(2,6,4'-trichloro-4-phenoxyphenyl)biguanide
1-(2,6-dibromo-4-(4'-chlorophenoxy)phenyl)biguanide
1-(2,6-dibromo-4-phenoxyphenyl)biguanide
1-(2,6-dibromo-4'-chloro-4-biphenyl)biguanide
1-(2,4-dichlorophenyl)biguanide
1-(2,3-dichlorophenyl)biguanide
1-(2,5-dichlorophenyl)biguanide
1-(2,4-dibromophenyl)biguanide.

The componds of this invention may be prepared by the following general procedures:

Condensation of cyanoguanide and an aryl or aralkylamine in the presence of an equimolar amount of a mineral acid results in the corresponding aryl or aralkylbiguanide.

The following reaction equation illustrates this synthesis:

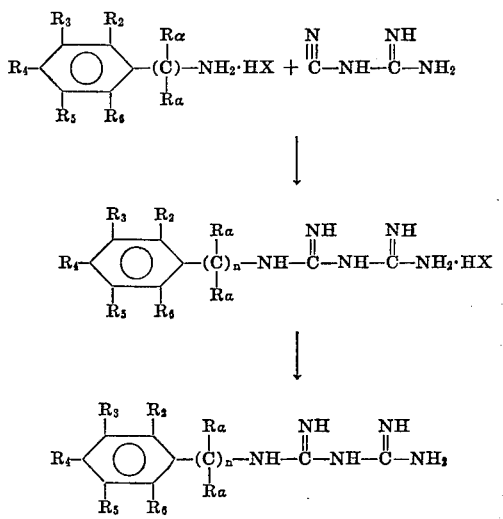

where $n$, $R_a$, $R_2$, $R_3$, $R_4$, $R_5$ & $R_6$ are as described above, and HX is a mineral acid.

The reaction is preferably carried out on the aryl or aralkylamine salt either in a polar medium or neat and using increased temperatures. The salt used may be any acid addition amine salt but preferably the salt of a mineral acid. The polar medium may be aqueous, partially aqueous or a non-aqueous solution. It is convenient to choose a solvent that will reflux at the desired reaction temperature. The more preferred solvents are water or alcohol but other solvents may be used such as DMSO, diethyleneglycol, ethyleneglycol, tetrahydrofuran, dimethylformamide, etc. The reaction should also be carried out at a temperature which is high enough so that condensation takes place readily, but not sufficient to decompose the biguanide formed. The reaction temperature can vary from room temperature to about 250° C. although it is preferable to run the reaction at temperatures from about 50° C. to 150° C. The biguanide salt which is formed can be converted to the free base with a metal hydroxide or alkoxide solution. The isolation of the desired biguanide can be carried out by any method known in the art.

Appropriately desired end products having various $R_2$, $R_3$, $R_4$, $R_5$ and $R_6$ substituents can be prepared at various stages of synthesis using suitable reactions in order to convert one group to another. Thus, for example, using conventional methods, a halogen group can be treated under Rosenmund Von Brown conditions to the nitrile compound which in turn can be hydrolyzed to a carboxy. A nitro can be reduced to an amino which can be alkylated to the dialkylamino substituent. A hydroxy compound can be prepared by demethylation of a methoxy substituent. A Sandmeyer type reaction can be carried out on an amino compound to introduce a chloro, bromo, xanthate, hydroxyl or alkoxyl group. The xanthate can then lead to the mercapto by hydrolysis, this turn can be alkylated to an alkylthio group which can be oxidized to alkylsulfinyl and alkylsulfonyl groups. A thiocyanato group may be reduced to a mercapto. An iodo group may be removed by catalytic hydrogenation.

Reactions can also be carried out on 1-phenylbiguanide compounds which result in further substituted products. In this regard, we have found that 1-phenylbiguanides may be halogenated nitrated or thiocyanated to obtain other and/or para substituted products. Thus, for example, bromination can be carried out on the following 1-phenyl-biguanides to obtain the desired products:

1-(4-trifluoromethylphenyl)biguanide
1-(4-bromophenyl)biguanide
1-(4-fluorophenyl)biguanide
1-(4-chlorophenyl)biguanide
1-(2,6-dichlorophenyl)biguanide
1-(4-iodophenyl)biguanide
1-(4-nitrophenyl)biguanide
1-(2,6-dibromo-4-trifluoromethylphenyl)biguanide
1-(2,4,6-tribromophenyl)biguanide
1-(2,6-dibromo-4-fluorophenyl)biguanide
1-(2,6-dibromo-4-chlorophenyl)biguanide
1-(2,6-dichloro-4-bromophenyl)biguanide
1-(2,6-dibromo-4-iodophenyl(biguanide
1-(2,6-dibromo-4-nitrophenyl)biguanide
1-(4'-chloro-4-biphenyl)biguanide
1-(4-phenoxyphenyl)biguanide
1-[4-(4'-chlorophenoxy)phenyl]biguanide
1-(2,4-dichlorophenyl)biguanide
1-(2,6-dibromo-4'-chloro-4-biphenyl)biguanide
1-(2,6-dibromo-4-phenoxyphenyl)biguanide
1-[2,6-dibromo-4-(4'-chlorophenoxy)phenyl]biguanide
1-(2,4-dichloro-6-bromophenyl)biguanide.

In an analogous manner, chlorination, nitration and thiocyanation can also be carried out to obtain corresponding products. Other reactions known in the art may also be employed.

The starting materials of this invention are either known compounds or their method of preparation is described.

We have found that the compounds of this invention have a useful degree of gastric anti-secretory activity and are effective in reducing the volume and the acidity of the gastric fluid in humans and mammals. Further, these compounds produce a considerable spasmolytic action on the gastrointestinal musculateur, i.e., they reduce the peristaltic action of the gastrointestinal musculature which is manifested by a delay in gastric emptying time.

Until now, the known gastric anti-secretory and gastrointestinal spasmolytic copounds have included such agents as atropine, homatropine, propantheline, dicyclomine, etc. These compounds, however, cause accompanying undesirable anti-cholinergic properties such as mydriasis, xerostomia, cyclopegia, etc. We have found that the 1-aryl and aralkylbiguanides of this invention are particularly useful as gastric anti-secretory agents because they are essentially devoid of these unwanted effects. It should further be noted that these compounds are also characterized by their low acute oral toxicity.

In particular the 1-aryl and aralkyl-biguanides as herein described are useful in the treatment of such gastro-intestinal disorders and diseases as duodenal ulcer and peptic ulcer.

The instant compounds may be used alone or in combination with other known antacids such as aluminum hydroxide, magnesium hydroxide, magnesium trisilicate, aluminum glycinate, calcium carbonate and the like.

For all these purposes, the biguanides of this invention can be normally administered orally or parenterally. Orally they may be administered as tablets, aqueous or oily suspension, dispersible powders or granules, emulsions, hard or soft capsules, or syrups or elixirs. The term parenteral as used herein, includes subcutaneous injection, intravenous, intramuscular or intrastrenal injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation. Tablets which contain the active 1-aryl and aralkylbiguanide ingredient in admixture with non-toxic pharmaceutically acceptable excipients are suitable for the manufacture of tablets. These excipients may be, for example, inert diluents, for example, calcium carbonate, sodium carbonate, lactose, calcium phosphate or sodium phosphate; granulat- and disintegrating agents, for example, maize starch or alginic acid; binding agents, for example, starch, gelatin or acacia; and lubricating agents, for example, magnesium stearate, stearic acid or talc. The tablets may be uncoated or they may be coated by known techniques to delay disintegration and absorption in the gastro-intestinal tract and thereby provide a sustained action over a longer period.

Formulations for oral use may also be presented as hard gelatin capsules wherein the active ingredient is mixed with an inert solid diluent, for example, calcium carbonate, calcium phosphate or kaolin, or as soft gelatin capsules wherein the active ingredient is mixed with an oil medium, for example, arachis oil, liquid paraffin or olive oil.

Aqueous solutions containing the active 1-aryl and aralkyl biguanides form a further embodiment of this invention. Excipients suitable for aqueous suspensions, may be employed if desired. These excipients are suspending agents, for example, sodium carboxymethylcellulose, methyl-cellulose, hydroxypropylmethylcellulose, sodium alginate, polyvinylpyrrolidine, gum tragacanth and gum acacia; dispersing or wetting agents may be a naturally occuring phosphatide, for example, lecithin; or condensation products of an alkylene oxide with fatty acids, for example, polyoxyethylene stearate; or condensation products of ethylene oxide with long-chain aliphatic alcohols, for example, heptadecaethyleneoxy-cetanol; or condensation products of ethylene oxide with partial esters derived from fatty acids and a hexitol, for example, polyoxyethylene sorbitol mono-oleate; or condensation products of ethylene oxide with partial esters derived from fatty acids and hexitol anhydrides, for example, polyoxyethylene sorbitan mono-oleate. The said aqueous suspensions may also contain one or more preservatives, for example, ethyl, or n-propyl, p-hydroxy benzoate, one or more coloring agents, one or more flavoring agents, and one or more sweetening agents, such as sucrose.

Oily suspensions may be formulated by suspending the active ingredient in a vegetable oil, for example, arachis oil, olive oil, sesame oil or coconut oil, or in a mineral oil, such as liquid paraffin. The oily suspensions may contain a thickening agent, for example, beeswax, hard paraffin or cetyl alcohol. Sweetening agents, such as those set forth above, and flavoring agents may be added to provide a palatable oral preparation. These compositions may be preserved by the addition of an anti-oxidant such as ascorbic acid.

Dispersible powders and granules suitable for preparation of an aqueous suspension by the addition of water provide the active ingredient in admixture with a dispersing or wetting agent, suspending or wetting agents and suspending agents are exemplified by those already mentioned above. Additional excipients, for example, sweetening, flavoring and coloring agents, may also be present.

The compounds of this invention may also be in the form of oil-in-water emulsions. The oily phase may be a vegetable oil, for example, olive oil or arachis oils, or a mineral oil, for example, liquid paraffin or mixtures of these. Suitable emulsifying agents may be naturally-occurring gums, for example, gum acacia or gum tragacanth, naturally-occurring phosphatides, for example, soya bean lecithin, and esters or partial esters derived from fatty acids and hexitol anhydrides, for example, sorbitan mono-oleate. The emulsions may also contain sweetening and flavoring agents.

Syrups and elixirs may be formulated with sweetening agents, for example, glycerol, sorbitol or sucrose. Such formulations may also contain a demulcent, a preservative and flavoring and coloring agents. The pharmaceutical compositions may be in the form of a sterile injectable preparation, for example, as a sterile injectable aqueous suspension. This suspension may be formulated according to the known art using those suitable dispersing or wetting agents and suspending agents which have been mentioned above. The sterile injectable preparation may also be a sterile injectable solution or suspension in a non-toxic parenterally-acceptable diluent or solvent, for example, as an aqueous solution buffered to a pH of 4.0 to 7.0 and made isotonic with sodium chloride.

Further, these compounds may be tableted or otherwise formulated so that for every 100 parts by weight of the composition, there are present between 5 and 95 parts by weight of the active ingredient. The dosage unit form will generally contain between about 1 mg. and about 500 mg. of the active ingredients of this invention. The preferred unit dose is between about 10 mg. and about 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of gastrointestinal disease conditions or symptoms, such as duodenal and peptic ulcer, and in the alleviation of hypertensive disorders. In general, the daily dose can be between about 0.5 mg./kg. and 70 mg./kg. (preferably in the range of 2–25 mg./kg./day), bearing in mind, of course, that in selecting the appropriate dosage in any specific case, consideration must be given to the patient's weight, general health, age, and other factors which may influence response to the drug.

Various tests in animals have been carried out to show the ability of the compounds of this invention to exhibit reactions that can be correlated with activity in humans. These tests involve such factors as the effect of the 1-aryl and aralkylbiguanides on gastric secretion, their spasmolytic effect, their mydriatic effect and determination of their toxicity. It has been found that the compounds of this invention when tested in the above variety of situations show a marked activity.

One such test is the gastric secretion test. This test is carried out as follows: Shay rats are fasted for 4–8 hours, and water is given ad lib. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on the dog. This is outlined in the *Handbook of Physiology*, Section 6: Alimentary Canal, Volume II: Secretion. American Physiology Society, Washington, D.C., 1967.

It has been found that the compounds of this invention when subjected to the above gastric secretion tests display marked ability to decrease gastric volume and gastric acidity. These tests are known to correlate well with gastric activity in humans and are standard tests used to determine anti-secretory properties.

To determine the anti-ulcer effectiveness the following test is employed: Male Wiston rats (130–150 grams) are fasted for 24 hours, then given reserpine at 5 mg./kg. i.p. Twenty-four hours later, the stomachs are removed and examined for ulceration. Ulcers are graded on a 0–4 scale and the number of ulcers is recorded. Pre-treatment with the biguanide compounds produces a decrease in ulcer grade and the number of ulcers compared to the control reserpine-treated rats.

Determination of anti-spasmolytic properties can be carried out by the procedure as outlined by D. A. Brodie and S. K. Kundrats in their article entitled "Effect of Drugs on Gastric Emptying in Rats," *Fed. Proc.* 24:714 (1965).

Mydriasis is detected by the procedure of R. A. Turner, *Screening Methods in Pharmacology*, Academic Press, New York, and London, pp. 174–5, 1965. Acute toxicity is calculated according to the standard Litchfield-Wilcoxon procedure.

In view of the results of these tests, the pharmacological data clearly indicates that the 1-aryl and aralkylbiguanides of this invention can be considered to be active gastric anti-secretory and anti-spasmolytic agents which are substantially free of anti-cholinergic side effects and having a low toxicity.

Tests in animals have also been carried out to show the ability of compounds of this invention to inhibit reactions that can be correlated with hypertensive effects in humans. One such test is outlined by Jacques de Champlain, Lawrence R. Krahoff and Julius Axelrod in *Circulation Research* XXIII:479 (1968). This testing method is known to correlate well with hypertensive activity in humans and is a standard test used to determine anti-hypertensive properties. In view of the results of this test, the 1-aryl and aralkyl biguanides of this invention can be considered to be active anti-hypertensive agents.

To determine the CNS depressant effectiveness of the compound of Formula I, the suppression of spontaneous motor activity is evaluated in normal mice (18–22 g.) and immature rats (90–100 g.) by a modification of the Dew method: Dews, *Brit. J. Pharmacol*: 8, 46 (1953). Results of this test indicate that a relative increase in depressant activity is evident.

The following are detailed examples which show the preparation of the compounds of this invention. They are to be construed as illustrations of said compounds and not as limitations thereof.

EXAMPLE 1

1-(p-Trifluoromethoxyphenyl)biguanide dihydrochloride

A stirred mixture of 6.3 g. (0.0296 mole) of p-aminophenyltrifluoromethyl ether hydrochloride and 2.49 g. (0.0296 mole) of cyanoguanidine is immersed in a 210° C. oil bath for fifteen minutes. The resulting amber glass-like reaction product is dissolved in 100 ml. of water, alkalized with 40% sodium hydroxide solution, and extracted with 250 ml. of ether. The ether layer is back-washed twice with 10 ml. of water, dried over sodium carbonate, filtered, and the ether solution made strongly acidic with a saturated ethereal hydrochloric acid solution. The precipitate is collected on a filter, washed twice with 50 ml. of anhydrous ether, and dried at 25° C./125 mm. Recrystallization from a mixture of isopropanol and cyclohexane (1:1) gives 1-(p-trifluoromethoxyphenyl)biguanide dihydrochloride (m.p. 209–211° C).

EXAMPLE 2

1-(p-Trifluoromethylbenzyl)biguanide dihydrochloride

A stirred mixture of 6.9 g. (0.035 mole) of p-trifluoromethylbenzylamine hydrochloride and 2.9 g. (0.035 mole) of cyanoguanidine is immersed in a 180° C. oil bath for one hour. The melt is cooled and dissolved in 35 ml. of hot water. The solution is cooled in an ice bath, made alkaline with 40% sodium hydroxide solution, and extracted with 150 ml. of ether. The ether layer is dried over potassium carbonate, filtered and the ether solution made strongly acidic with a saturated ethereal hydrochloric acid solution. The precipitate is washed twice with 25 ml. of anhydrous ether and recrystallized from a mixture of ethanol and heptane (3:5) to obtain 1-(p-trifluoromethylbenzyl)biguanide (m.p. 223–225° C.).

EXAMPLE 3

1-(α-Methyl-p-trifluoromethylbenzyl)biguanide dihydrochloride

A stirred mixture of 15.5 g. (0.0687 mole) of α-methyl-p-trifluoromethylbenzylamine hydrochloride and 6.35 g. (0.0756 mole) of cyanoguanidine is immersed in a 190° C. oil bath for ten minutes. The melt is cooled to room temperature, dissolved in 100 ml. of water, made alkaline with 40% sodium hydroxide solution and extracted twice with 200 ml. of ether. The combined ether extracts are dried over potassium carbonate, filtered, and the ether solution made strongly acidic with a saturated ethereal hydrochloric acid ether solution. The precipitate is collected on a filter, washed twice with 50 ml. of anhydrous ether, and dried at 40° C./125 mm. for 5 hours. The dihydrochloride is dissolved in 50 ml. of water, made strongly alkaline with 40% sodium hydroxide solution, and extracted twice with 100 ml. of ether. The combined ether extracts are dried over potassium carbonate, filtered, and the ether solution made strongly acidic with a saturated ethereal hydrochloric acid solution. The precipitate is collected on a filter, washed twice with 50 ml. of anhydrous ether, and dried at 40° C./125 mm. to obtain 1-(α-methyl-p-trifluoromethylbenzyl)biguanide dihydrochloride.

EXAMPLE 4

1-(2,6-Dichlorophenyl)biguanide

A stirred mixture of 300 g. (1.85 mole) of 2,6-dichloroaniline, 155 g. (1.85 mole) of cyanoguanidine and 712 ml. of 2.6 N hydrochloric acid (1.85 mole) is treated at 60° C. for several hours. The reaction mixture is then cooled, alkylated with 40% sodium hydroxide and extracted with 1:1 ether-ethanol. The extract is washed with a saturated saline solution and dried over sodium sulfate. The solvent is evaporated and replaced with benzene which on concentrating results in the crude product. The residue is dissolved in 100 ml. of hot methanol and 200 methanol and 200 ml. of water is added. The precipitate is removed, washed with water and dried. The hydrochloride salt is then made in alcohol to obtain 1-(2,6-dichlorophenyl)biguanide hydrochloride (m.p. 236° C.).

EXAMPLE 5

1-(p-N,N-Dimethylsulfamylphenyl)biguanide

To 11 g. (0.055 mole) of p-N,N-dimethylsulfamylaniline is added 17.68 ml. (0.055 mole) of 3.1N hydrochloric acid. This is heated on a steam bath with 15 ml. of isopropanol and 4.62 g. (0.055 mole) of cyanoguanidine. The reaction mixture is heated for 18 hours. The alcohol is evaporated off and diluted with 250 ml. of 7.4% hydrochloric acid. The mixture is filtered, cooled and made alkaline with 10% sodium hydroxide. The precipitate is filtered, triturated with 100 ml. of boiling isopropanol and filtered to get 1-(p-N,N-dimethylsulfamylphenyl)biguanide (m.p. 190–190.5° C.).

EXAMPLE 6

1-(2,4,6-Trichlorophenyl)biguanide hydrochloride

To 20 g. (0.1 mole) of 2,4,6-trichloroaniline and 10 g. (0.1 mole) of cyanoguanidine in 10 ml. (0.1 mole) of concentrated hydrochloric acid is added 125 ml. of n-butanol. The reaction mixture is refluxed for 17 hours, cooled and the alcohol evaporated off. The residue is extracted with ether after making it alkaline with 40% sodium hydroxide. The ether extract is dried over potassium carbonate and evaporated. The residue is dissolved in methanol, the pH adjusted to about 7, charcoal filtered and evaporated. The residue is triturated with ether and the solid that forms is recrystallized from water to obtain 1-(2,4,6-trichlorophenyl)biguanide hydrochloride (m.p. 170–2° C.).

EXAMPLE 7

1-[3,5-Di(trifluoromethyl]biguanide

To 22.9 g. (0.1 mole) of 3,5-di(trifluoromethyl)aniline and 8.4 g. (0.1 mole) of cyanoguanidine is added 10 ml. of concentrated hydrochloric acid and 20 ml. of water. The solution is heated on a steam bath for 1 hour at which time a solid precipitates out. The reaction mixture is cooled to room temperature, made strongly alkaline with 40% NaOH and extracted with ether. The ether layer is dried over potassium carbonate, and evaporated in vacuo to obtain an oil. The residue is triturated with 500 ml.

heptane and the solid which forms is recrystallized from methylene chloride to obtain 1-[3,5-di(trifluoromethyl)phenyl]biguanide (m.p. 148–9° C.).

EXAMPLE 8

1-(2,3,4,6-Tetrafluorophenyl)biguanide

A mixture of 7.0 g. (0.035 mole) of 2,3,4,6-tetrafluoroaniline hydrochloride and 2.9 g. (0.035 mole) of cyanoguanidine is heated at a melt for 1½ hours. The mixture is then cooled, heated with 25 ml. of water until solution and then made alkaline with 40% sodium hydroxide. The solution is extracted with ether and dried over potassium carbonate and evaporated to dryness. The residue is chromatogramed on silica gel using isopropanol:$NH_4OH$ to obtain 1-(2,3,4,6-tetrafluorophenyl)biguanide.

EXAMPLE 9

When the procedures of Examples 1–8 are followed but the starting materials are substituted for those below, then the corresponding product is obtained.

| Starting material | Product |
|---|---|
| 2,6-dibromoaniline | 1-(2,6-dibromophenyl)biguanide. |
| 2,3,4-trichloroaniline | 1-(2,3,4-trichlorophenyl)biguanide. |
| 2,3,5-trichloroaniline | 1-(2,3,5-trichlorophenyl)biguanide. |
| 2,6-dichloro-4-nitroaniline | 1-(2,6-dichloro-4-nitrophenyl)biguanide. |
| 2,6-dimethoxyaniline | 1-(2,6-dimethoxyphenyl)biguanide. |
| 2,6-dichloro-4-(p-chlorophenyl)aniline | 1,2,6-dichloro-4-(p-chlorophenyl)biguanide. |
| 2,6-dichloro-4-dimethylsulfamidoaniline | 1-(2,6-dichloro-4-dimethylsulfamidophenyl)biguanide. |
| 2,6-difluoroaniline | 1-(2,6-difluorophenyl)biguanide. |
| 2,6-dichlorobenzylamine | 1-(2,6-dichlorobenzyl)biguanide. |
| 2,6-dibromobenzylamine | 1-(2,6-dibromobenzyl)biguanide. |
| 2,4,6-trichlorobenzylamine | 1-(2,4,6-trichlorobenzyl)biguanide. |
| 2,6-dichloro-α-methylbenzylamine | 1-(2,6-dichloro-α-methylbenzyl)biguanide. |
| 2,4,6-trichloro-α-methylbenzylamine | 1-(2,4,6 trichloro-α-methylbenzyl)biguanide. |
| 2,6-dinitroaniline | 1-(2,6-dinitrophenyl)biguanide. |
| 3,4,5-trimethoxyaniline | 1-(3,4,5-trimethoxyphenyl)biguanide. |
| 2,4,6-trimethoxyaniline | 1-(2,4,6-trimethoxyphenyl)biguanide. |
| 3,5-dichloro-4-methoxyaniline | 1-(3,5-dichloro-4-methoxyphenyl)biguanide. |
| 2,3,4,5-tetrafluoroaniline | 1-(2,3,4,5-tetrafluorophenyl)biguanide. |
| 2,6-difluorobenzylamine | 1-(2,6-difluorobenzyl)biguanide. |
| 2,6-dibromo-α-methylbenzylamine | 1-(2,6-dibromo-α-methylbenzyl)biguanide. |
| 2,6-dichloro-4-hydroxyaniline | 1-(2,6-dichloro-4-hydroxyphenyl)biguanide. |
| 2,4,6-tribromobenzylamine | 1-(2,4,6-tribromobenzyl)biguanide. |
| 2,6-dichloro-4 carboxyaniline | 1-(2,6-dichloro-4-carboxyphenyl)biguanide. |
| 4-phenylaniline | 1-(4-biphenylyl)biguanide. |
| 2,6-dichloro-4-carbethoxyaniline | 1-(2,5-dichloro-4-carbethoxyphenyl)biguanide. |
| 2,6-dicarbethoxyaniline | 1-(2,6-dicarbethoxyphenyl)biguanide. |
| 4-acetoxybenzylamine | 1-(4-acetoxybenzyl)biguanide. |
| o,m & p-Trifluoromethoxybenzylamine | 1-(o,m & p-trifluoromethoxybenzyl)biguanide. |
| 4-(p-chlorophenoxy)aniline | 1-[4-(p-chlorophenoxy)phenyl]biguanide. |
| 2,6-dichloro-4-dimethylamino aniline | 1-(2,6-dichloro-4-dimethylaminophenyl)biguanide. |
| p-Cyanobenzylamine | 1-(pcyanobenzyl)biguanide. |
| 2,6-di(trifluoromethyl)aniline | 1-[2,6-di(trifluoromethyl)phenyl]biguanide. |
| p-fluoro-α-methylbenzylamine | 1-(p-fluoro-α-methylbenzyl)biguanide. |
| 2,6-dichloro-α,α-dimethylbenzylamine | 1-(2,6-dichloro-α,α-dimethyl-benzyl)biguanide. |
| p-Chloro-α-methylbenzylamine | 1-(p-chloro-α-methylbenzyl)biguanide. |
| o & m-Trifluoromethyl-α-methylbenzylamine | 1-(o & m-trifluoromethyl-α-methylbenzyl)biguanide. |
| 2,6-di-i-propylaniline | 1-(2,6-di-i-propylphenyl)biguanide. |
| 2,4-dichloroaniline | 1-(2,4-dichlorophenyl)biguanide. |
| 2,4-dibromoaniline | 1-(2,4-dibromophenyl)biguanide. |
| 2,4-difluoroaniline | 1-(2,4-difluorophenyl)biguanide. |
| 2,3-difluoroaniline | 1-(2,3-difluorophenyl)biguanide. |
| 2,5-difluoroaniline | 1-(2,5-difluorophenyl)biguanide. |

The following examples are representative of converting one substituent to another.

EXAMPLE 10

1-(2,6 Dibromo-4-trifluoromethylphenyl)biguanide

To a slurry of 15 g. (0.06 mole) of p-trifluoromethylphenylbiguanide in 200 ml. of water is added dropwise 19.2 g. (0.12 mole) of bromine over a period of 3 hours. The reaction mixture is cooled and the unreacted bromine discharged with sodium bisulfite. The mixture is made strongly alkaline and extracted into ether. The ether layer is dried over $Na_2SO_4$, charcoal, filtered and evaporated. The solid residue is recrystallized from dioxane/water to obtain 1-(2,6-dibromo-4-trifluoromethylphenyl)biguanide.

When the procedure of Example 10 is followed but the starting material is substituted for those below, then the corresponding product is obtained.

| Starting material | Product |
|---|---|
| 1-(4-trifluoromethylphenyl)biguanide. | 1-(2,6-dibromo-4-trifluoromethylphenyl)biguanide. |
| 1-(4-bromophenyl)biguanide | 1-(2,4,6-tribromophenyl)biguanide. |
| 1-(4-fluorophenyl)biguanide | 1-(2,6-dibromo-4-fluorophenyl)biguanide. |
| 1-(4-chlorophenyl)biguanide | 1-(2,6-dibromo-4-chlorophenyl)biguanide. |
| 1-(2,6-dichlorophenyl)biguanide | 1-2,6-dichloro-4-bromophenyl)biguanide. |
| 1-(4-iodophenyl)biguanide | 1-(2,6-dibromo-4-iodophenyl)biguanide. |
| 1-(4-nitrophenyl)biguanide | 1-(2,6-dibromo-4-nitrophenyl)biguanide. |
| 1-(4'-chloro-4-biphenyl)biguanide | 1-(2,6-dibromo-4'-chloro-4-biphenyl)biguanide. |
| 1-(4-phenoxyphenyl)biguanide | 1-(2,6-dibromo-4-phenoxyphenyl)biguanide. |
| 1-[4-(4'-chlorophenoxy)phenyl]biguanide. | 1-[2,6-dibromo-4-(4'-chlorophenoxy)phenyl]biguanide. |
| 1-(2,4-dichlorophenyl)biguanide | 1-(2,4-dichloro-6-bromophenyl)biguanide. |

When chlorine is used in the above example, then the corresponding chlorinated product is obtained.

EXAMPLE 11

1-(2,6-Dichloro-4-thiocyanatophenyl)biguanide

A solution of 1-(2,6-dichlorophenyl)biguanide (28.0 g.) (0.1 mole) in methanol (60 ml.) previously saturated with sodium bromide is cooled to 5° C. with stirring. Sodium thiocyanate is added and stirring continued for ten minutes.

To this mixture is added dropwise with stirring, a solution of bromine (17.6 g.) in methanol (20 ml.) previously saturated with sodium bromide.

When the reaction is complete, water is added (300 ml.) and the mixture made alkaline (pH 12) with 40% sodium hydroxide. The organic base is extracted into ether, and the ether solution washed with brine, dried ($Na_2SO_4$) and evaporated to dryness. The residue is crystallized from aqueous methanol to give 1-(2,6-dichloro-4-thiocyanatophenyl)biguanide.

Then the procedure of Example 11 is followed but the starting material is substituted for these below, then the corresponding product is obtained.

| Starting material | Product |
|---|---|
| 1-(2,6-dibromophenyl)biguanide | 1-(2,6-dibromo-4-thiocyanatophenyl)biguanide. |
| 1-(2,4-dichlorophenyl)biguanide | 1-(2,4-dichloro-6-thiocyanatophenyl)biguanide. |
| 1-(2-chlorophenyl)biguanide | 1-(2-chloro-4,6-dithiocyanatophenyl)biguanide. |
| 1-(2,4-dibromophenyl)biguanide | 1-(2,4-dibromo-6-thiocyanatophenyl)biguanide. |

EXAMPLE 12

1-(4-Nitro-2,6-dichlorophenyl)biguanide 1-(2,6-Dichloro-4-thiocyanatophenyl)biguanide g.) is added to concentrated sulfuric acid (18 ml.) and stirred for 5 minutes. Concentrated nitric acid (Sp. G. 1.51) (2.5 ml.) is added dropwise, maintaining the temperature between 30 and 40° by water cooling if necessary.

After addition of the nitric acid is complete, the mixture is stirred for ten minutes, then poured into water.

The mixture is made alkaline with sodium hydroxide, then extracted with ether. The ether extract is washed, dried ($Na_2SO_4$) evaporated and the residue crystallized from aqueous methanol to give 1-(4-nitro-2,6-dichlorophenyl)biguanide.

When the procedure of Example 12 is followed but the starting material is substituted for those below, then the corresponding product is obtained.

| Starting material | Product |
|---|---|
| 1-(4-trifluoromethylphenyl)biguanide. | 1-(2,6-dinitro-4-trifluoromethylphenyl)biguanide. |
| 1-(4-bromophenyl)biguanide | 1-(2,6-dinitro-4-bromophenyl)biguanide. |
| 1-(2-iodophenyl)biguanide | 1-(2-iodo-4,6-dinotrophenyl)biguanide. |
| 1-(4-chlorophenyl)biguanide | 1-(2,6-dinitro-4-chlorophenyl)biguanide. |
| 1-(4-iodophenyl)biguanide | 1-(2,6-dinitro-4-iodophenyl)biguanide. |
| 1-(2,4-dichlorophenyl)biguanide | 1-(2,4-dichloro-6-nitrophenyl)biguanide. |
| 1-(2,4-dibromophenyl)biguanide | 1-(2,4-dibromo-6-nt-rophenyl)biguanide. |
| 1-(2-chlorophenyl)biguanide | 1-(2-chloro-4,6-dinitrophenyl)biguanide. |
| 1-(2-iodophenyl)biguanide | 1-(2-iodo-4,6-dinitrophenyl)biguanide. |
| 1-[4-(p-chlorophenoxy)phenyl]biguanide. | 1-[2,6-dinitro-4-(p-chlorophenoxy)biguanide. |
| 1-(2,6-dichloro-α-methylbenzyl)biguanide. | 1-(2,6-dichloro-4-nitro-α-methylbenzyl)biguanide. |
| 1-(2,6-dibromophenyl)biguanide | 1-(2,6-dibromo-4-nitrophenyl)biguanide. |
| 1-[4-(p-chlorophenyl)phenyl]biguanide. | 1-[2,6-dinitro-4-(p-chlorophenyl)phenyl]biguanide. |

EXAMPLE 13

1-(2,6-Dibromophenyl)biguanide hydroiodide

A solution of 1-(2,6-dibromo-4-iodophenyl)biguanide (47 g.) (0.1 mole) in methanol (500 ml.) is shaken in an atmosphere of hydrogen in the presence of 5% palladium or charcoal (1 g.). When the hydrogen uptake is measured to be 2.4 l. at R.T. and P., the shaking is stopped and the mixture filtered through diatomaceous earth.

The filtrate is evaporated to dryness and the solid residue dissolved in methanol (100 ml.). Upon addition of ether (150 ml.) with stirring, 1-(2,6-dibromophenyl)biguanide hydroiodide is obtained.

EXAMPLE 14

Ten thousand tablets for oral use, each containing 50 mg. of 1-(2,6-dichlorophenyl)biguanide hydrochloride, are prepared from the following types and amounts of material:

Ingredient: Grams
1 - (2,6 - dichlorophenyl)biguanide hydrochloride _____ 500
Lactose U.S.P. _____ 350
Potato Starch U.S.P. _____ 346

The mixture is moistened with an alcoholic solution of 20 grams of stearic acid and granulated through a sieve. After drying, the following ingredients are added:

Ingredient: Grams
Potato starch U.S.P. _____ 320
Talcum _____ 400
Magnesium stearate _____ 500
Colloidal silicium dioxide _____ 64

The mixture is thoroughly mixed and compressed into tablets.

EXAMPLE 15

Five hundred ampoules each with two ml. of solution which contain 15 mg. of 1-(2,4,6-trichlorophenyl)biguanide hydrochloride is prepared from the following types and amounts of materials:

Ingredient: Grams
1 - (2,4,6-trichlorophenyl)biguanide hydrochloride _____ 7.5
Ascorbic acid _____ 1
Sodium bisulphite _____ 0.5
Sodium sulphite _____ 1

The previous ingredients are added to distilled water, diluted to 1 liter of solution and thoroughly mixed. The solution is used to fill ampoules which are sterilized hot in the usual way.

EXAMPLE 16

An elixir in which each 5 ml. contains 50 mg. of 1-(p-trifluoromethylphenyl)biguanide hydrochloride is prepared by diluting 750 ml. of invert sugar with 100 ml. of water and adding to this 0.3 g. of benzoic acid and 10 g. of 1-(p-trifluoromethylphenyl)biguanide hydrochloride. 100 ml. of alcohol (U.S.P.) containing 0.2 g. of flavors is added and water is added to a total volume of 1 liter. The solution is thoroughly mixed, filtered, and bottled.

EXAMPLE 17

Capsules are prepared as follows:

150 g. of 1-(2,6-dichloro-α-methylbenzyl)biguanide hydrochloride,
3 g. magnesium stearate,
2 g. of finely divided silica sold under the trademark CAB-O-SIL by Godfrey L. Cabot, Inc., Boston, Mass., and
234 g. of lactose.

The ingredients are thoroughly mixed with each other and the mixture is filled in gelatin capsules. Each capsule contains 500 mg. of the composition and thus 150 mg. of 1-(2,6-dichloro-α-methylbenzyl)biguanide hydrochloride.

EXAMPLE 18

Tablets are prepared as follows:

100 g. of 1-(2,6-dibromophenyl)biguanide hydrochloride,
20 g. of corn starch,
14 g. of calcium carbonate, and
1 g. of magnesium stearate.

The active compound and the starch are thoroughly mixed, moistened with a 10% gelatin solution, and granulated by pressing through a #20 sieve. The granules are dried, thoroughly mixed with calcium carbonate and magnesium stearate, and compressed into tablets, each weighing about 125 mg. and containing 100 mg. of 1-(2,6-dibromophenyl)biguanide hydrochloride.

EXAMPLE 19

Composition:

75 g. of 1-(2,6-dichlorophenyl)biguanide hydrochloride
50 g. of microcrystalline cellulose,
10 g. of polyvinylpyrrolidine,
5 g. of magnesium stearate, and
85 g. of starch.

The active compound and cellulose are intimately mixed, moistened with a polyvinylpyrrolidine solution in water, and granulated by pressing through a #10 sieve. The dried granules are mixed with starch and magnesium stearate and are compressed to dragee cores, each weighing 225 mg. The cores are now provided with an elastic subcoat of an aqueous sugar solution containing 60 g. of powdered acacia, 60 g. of powdered gelatin, and 600 g. of sugar per liter of solution. Thereafter a dusting powder mixture of 180 g. of powdered sugar, 60 g. of powdered starch, 1 g. of powdered talc, and 1 g. of powdered acacia is applied to the dragee cores. Coating with the gelatin subcoat and dusting are repeated about five times. The thus treated cores are sugar coated in the coating pan with a 60% sugar solution. Sugar coating is repeated until each dragee weighs about 400 mg.

EXAMPLE 20

Composition:

50 g. of 1-(2,6-dichlorophenyl)biguanide hydrochloride,
200 g. of magnesium hydroxide gel,
200 g. of aluminum hydroxide gel,
240 g. of sorbitol, Composition:—Continued 10 g. of methyl p-hydroxybenzoate, and
q.s. 5000 cc. of distilled water.

The ingredients are intimately dissolved and suspended in the distilled water. Flavoring agent may be added thereto if desired. 5 cc. of the resulting suspension contain 50 mg. of 1-(2,6-dichlorophenyl)biguanide hydrochloride, 200 mg. of magnesium hydroxide, and 200 mg. of aluminum hydroxide.

EXAMPLE 21

50 g. of 1-(p-trifluoromethylphenyl)biguanide acetate, 5 g. of propyl p-hydroxybenzoate are dissolved and diluted to 5000 cc. with twice distilled water after the addition of modified Sorensen buffer solution in an amount sufficient to adjust the pH-value to a pH of 6.0. Sodium chloride is dissolved therein in an amount sufficient to render the resulting solution isotonic. The final solution is passed through a bacteriological filter and the filtrate is autoclaved at 120° C. for 15 minutes to yield a parenterally applicable solution which contains 50 mg. of 1-(p-trifluoromethylphenyl)biguanide acetate in 5 cc.

We claim:

1. A method for treating hypertension in humans or mammals which comprises orally or parenterally administering to said humans or mammals from 0.5 to 70 mg./kg. per day of 1-(2,6-dichlorophenyl) biguanide.

2. A method for treating hypertension in humans or mammals which comprises orally or parenterally administering to said humans or mammals from 0.5 to 70 mg./kg. per day of 1-(2,6-difluorophenyl) biguanide.

3. A method for treating hypertension in humans or mammals which comprises orally or parenterally administering to said humans or mammals from 0.5 to 70 mg./kg. per day of 1-(2,4-difluorophenyl) biguanide.

4. A method for treating hypertension in humans or mammals which comprises orally or parenterally administering to said humans or mammals from 0.5 to 70 mg./kg. per day of 1-(2,4-dichlorophenyl) biguanide.

5. A method for treating hypertension in humans or mammals which comprises orally or parenterally administering to said humans or mammals from 0.5 to 70 mg./kg. per day of 1-(2,4-dibromophenyl) biguanide.

6. A method for treating hypertension in humans or mammals which comprises orally or parenterally administering to said humans or mammals from 0.5 to 70 mg./kg. per day of 1-(2-chloro-4-bromophenyl) biguanide.

7. A method for treating hypertension in humans or mammals which comprises orally or parenterally administering to said humans or mammals from 0.5 to 70 mg./kg. per day of 1-(2-bromo-4-chlorophenyl) biguanide.

8. A method for treating hypertension in humans or mammals which comprises orally or parenterally administering to said humans or mammals from 0.5 to 70 mg./kg. per day of 1-(2,4,6-trichlorophenyl) biguanide.

9. A method for treating hypertension in humans or mammals which comprises orally or parenterally administering to said humans or mammals from 0.5 to 70 mg./kg. per day of 1-(2,6-dichloro-4-trifluoromethyl) biguanide.

References Cited

UNITED STATES PATENTS

| 3,366,650 | 1/1968 | Bernstein et al. | 424—326 |
| 3,456,059 | 7/1969 | Wick et al. | 424—326 |

FOREIGN PATENTS

| 40–11628 | 9/1965 | Japan | 424—326 |

OTHER REFERENCES

Brit J. Pharmacol, (1958) *13* 372, pp. 372–377.
Antibiotics and Chemotherapy 11 572–582 (1961).

ALBERT T. MEYERS, Primary Examiner

F. E. WADDELL, Assistant Examiner

U.S. Cl. X.R.

260—565; 424—304